(12) United States Patent
Matsumoto et al.

(10) Patent No.: US 7,679,609 B2
(45) Date of Patent: Mar. 16, 2010

(54) TOUCH PANEL

(75) Inventors: Kenichi Matsumoto, Osaka (JP); Koji Tanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 756 days.

(21) Appl. No.: 11/533,146

(22) Filed: Sep. 19, 2006

(65) Prior Publication Data

US 2007/0069251 A1 Mar. 29, 2007

(30) Foreign Application Priority Data

Sep. 21, 2005 (JP) .............................. 2005-273331

(51) Int. Cl.
*G09G 5/00* (2006.01)
(52) U.S. Cl. .................... 345/173; 178/18.01
(58) Field of Classification Search ......... 345/173–179; 428/447, 339, 336, 195, 697, 699; 178/18.01–18.09
See application file for complete search history.

(56) References Cited

U.S. PATENT DOCUMENTS 6,689,458 B1 * 2/2004 Mikoshiba et al. .......... 428/339
7,014,916 B2 3/2006 Tanabe

FOREIGN PATENT DOCUMENTS

| CN | 1489164 A | 4/2004 |
|---|---|---|
| JP | 02-129808 | 5/1990 |
| JP | 2000-010732 | 1/2000 |
| JP | 04-065038 | 3/2002 |
| JP | 2002-297319 | 11/2002 |

* cited by examiner

*Primary Examiner*—Regina Liang
(74) *Attorney, Agent, or Firm*—RatnerPrestia

(57) ABSTRACT

A touch panel including a substrate body having a wave plate, a first elastic layer and a first substrate, a second substrate facing to the substrate body, a first conductive layer, a second conductive layer, a second elastic layer and a polarizing plate. A first conductive layer is formed at a face, which is a side of the second substrate, of the substrate body. A second conductive layer is formed at a face of the second substrate and faces the first conductive layer with a predetermined space therebetween. The second elastic layer is formed at a face, which is an opposite side of the first conductive layer, of the substrate body. The polarizing plate is formed at a face, which is an opposite side of the second substrate, of the second elastic layer. This structure offers a touch panel which is resistant to crack or damage to the first conductive layer that may occur when an end of the touch panel is pressed, and provides reliable operation and good viewability.

8 Claims, 2 Drawing Sheets

TOUCH PANEL

BACKGROUND OF THE INVENTION

1. Field of the Invention

The present invention relates to touch panels for operating electronic devices.

2. Background Art

With electronic devices such as mobile phones and car navigation systems becoming increasingly sophisticated and diversified, many products are adopting a light-transmissive touch panel on a front face of a display device, typically a liquid crystal display. The user of the electronic device views what is displayed on the display device on a rear face of the touch panel through this touch panel, and presses the touch panel typically with a finger or pen so as to operate it and switch between the functions of the electronic device. Accordingly, the user requires a touch panel with good viewability and reliable operation.

A conventional touch panel is described next with reference to FIG. 4.

FIG. 4 is a sectional view of the conventional touch panel. In FIG. 4, wave plate 101 is a quarter-wave plate which is given birefringence by stretching a film typically of polycarbonate resin. Lower substrate 102 is light-transmissive. Light-transmissive upper conductive layer 103, made typically of indium tin oxide, is formed at a lower face of wave plate 101. Light-transmissive lower conductive layer 104, made typically of indium tin oxide, is formed at a top face of lower substrate 102.

A plurality of dot spacers (not illustrated) are formed, using insulting resin, at predetermined intervals on a top face of lower conductive layer 104. A pair of upper electrodes (not illustrated) is formed on both ends of upper conductive layer 103. A pair of lower electrodes (not illustrated) is formed on both ends of lower conductive layer 104 in a direction perpendicular to the upper electrodes.

An adhesive layer (not illustrated) is applied to top and lower faces of frame-like spacer 105. This adhesive layer attaches wave plate 101 and lower substrate 102 together by their outer borders. Accordingly, upper conductive layer 103 and lower conductive layer 104 are disposed facing each other with a predetermined space in between.

Polarizing plate 106 is formed typically by laminating triacethyl cellulose film on top and lower faces of a stretched and oriented polarizer to which iodine and dye have been adsorbed in polyvinyl alcohol. This polarizing plate 106 is attached to a top face of wave plate 101 to configure touch panel 100.

Touch panel 100 is disposed at a front face of typically a liquid crystal display device (not illustrated), and then mounted on an electronic device (not illustrated). A pair of upper electrodes and a pair of lower electrodes are coupled to electronic circuit (not illustrated) of the electronic device.

A top face of polarizing plate 106 at central part 106a, end 106b, and so on is pressed typically by a finger or pen while the user views what is displayed on the liquid crystal display device on a rear face of touch panel 100. For example, touch panel 100 is operated in a direction indicated by arrow E or arrow F. This operation makes polarizing plate 106 and wave plate 101 dent, and upper conductive layer 103 and lower conductive layer 104 come into local contact at a portion pressed.

Then, the electronic circuit applies voltage sequentially to the upper electrodes and the lower electrodes. The electronic circuit detects a portion pressed based on the voltage ratio of the upper electrodes and the voltage ratio of the lower electrodes. This switches between the various functions of the electronic device.

External light, such as sunlight or lamplight irradiated from above touch panel 100, first passes through polarizing plate 106. When the external light passes through polarizing plate 106, light in the X direction and light in the Y direction perpendicular to the X direction are linearly polarized only to either direction by polarizing plate 106. For example, when polarizing plate 106 has the characteristic of absorbing light in the Y direction, only light of linearly polarized light in the X direction pass through polarizing plate 106. This light exits from polarizing plate 106, and enters wave plate 101.

The light entering wave plate 101 is polarized from linearly polarized light to circularly polarized light as a result of passing through wave plate 101, and then exits from wave plate 101. Light exiting from wave plate 101 are reflected upward on lower conductive layer 104.

The light reflected on the surface of lower conductive layer 104 passes through wave plate 101 again. The light is now linearly polarized in the Y direction which is shifted by a half-wavelength, and enters polarizing plate 106. However, since polarizing plate 106 has the characteristic of passing through only the light in the X direction, polarizing plate 106 blocks any reflected light which is linearly polarized in the Y direction.

In other words, any external light entering touch panel 100 from above touch panel 100 is reflected upward on lower conductive layer 104. However, polarizing plate 106 blocks the light reflected on lower conductive layer 104, and thus this light does not exit from the top face of polarizing plate 106, which is the operation face. Accordingly, reflection of external light on the surface of touch panel 100 is eliminated, offering good viewability. The liquid crystal display device on the rear face of touch panel 100 is thus easily viewable.

Conventional touch panel 100 is typically disclosed in Japanese Patent Unexamined Publication No. 2000-10732.

SUMMARY OF THE INVENTION

A touch panel of the present invention includes a substrate body having a wave plate, a first elastic layer and a first substrate, a second substrate facing to the substrate body, a first conductive layer, a second conductive layer, a second elastic layer and a polarizing plate. A first conductive layer is formed at a face, which is a side of the second substrate, of the substrate body. A second conductive layer is formed at a face of the second substrate and faces the first conductive layer with a predetermined space therebetween. The second elastic layer is formed at a face, which is an opposite side of the first conductive layer, of the substrate body. The polarizing plate is formed at a face, which is an opposite side of the second substrate, of the second elastic layer. This structure offers a touch panel which is resistant to a crack or damage that may occur to the first conductive layer when an end of the touch panel is operated, and provides reliable operation and good viewability.

DETAILED DESCRIPTION OF THE INVENTION

Figure 2:
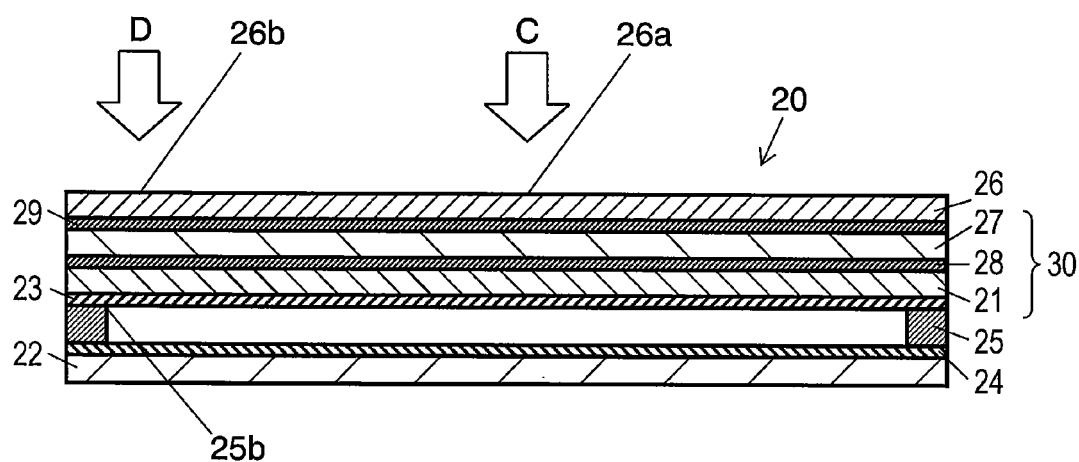
FIG. 2 is a sectional view of the touch panel in FIG. 1, taken along line 2-2.
Figure 3:
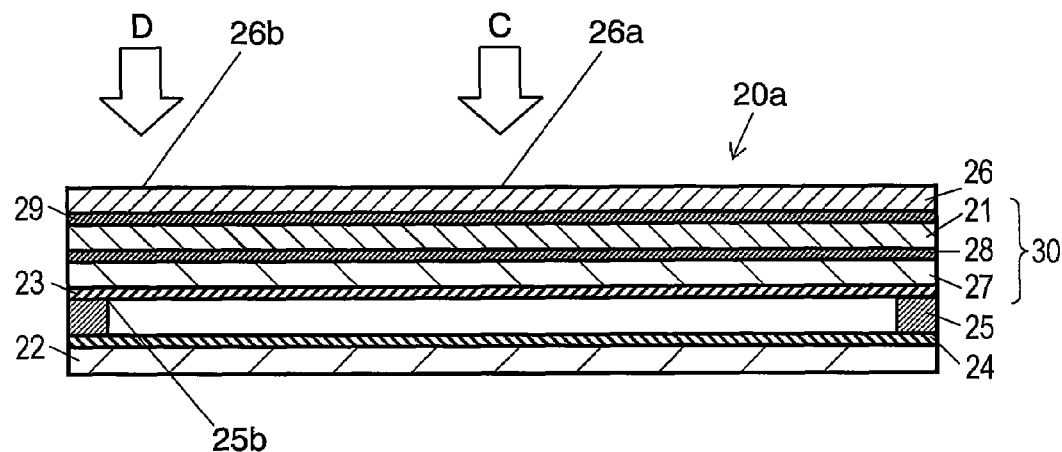
FIG. 3 is a sectional view of the touch panel in another preferred embodiment of the present invention.
Figure 4:
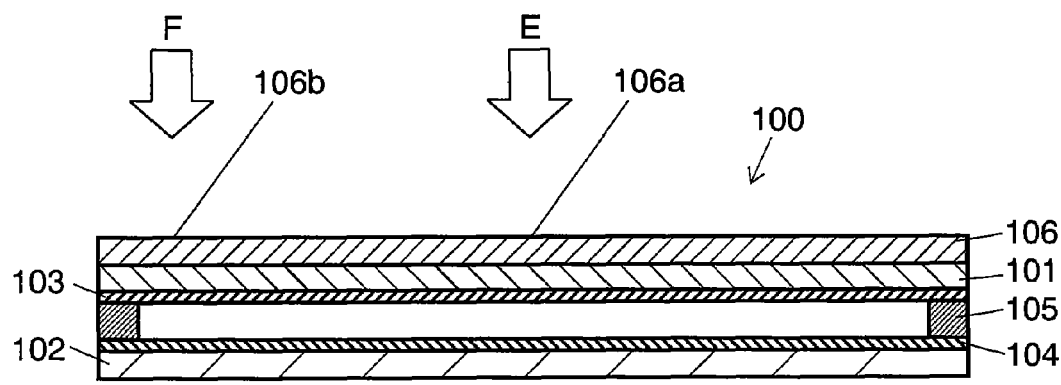
FIG. 4 is a sectional view of a conventional touch panel.

A preferred embodiment of the present invention is described below with reference to FIGS. 1 to 3.

Embodiment

Figure 1:
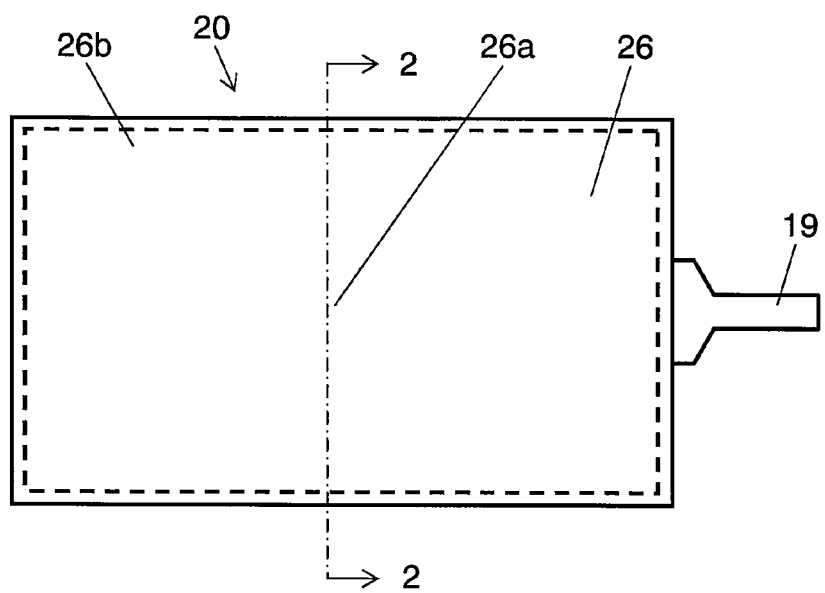
FIG. 1 is a plan view of a touch panel in a preferred embodiment of the present invention.

FIG. 1 is a plan view of a touch panel in the preferred embodiment of the present invention. FIG. 2 is a sectional view of the touch panel shown in FIG. 1 taken along line 2-2. In FIGS. 1 and 2, flexible wave plate 21 is a quarter-wave plate given birefringence by stretching a film typically of polycarbonate resin or cyclo-olefin polymer. Light-transmissive first substrate 27 (herein after referred to as 'substrate 27') is film-shaped. Substrate 27 is made of an optically-isotropic material, typically polycarbonate resin or polyethersulfone resin. Wave plate 21 and substrate 27 are laminated to configure substrate body 30 which is a laminated substrate. Light-transmissive second substrate 22 (herein after referred to as 'substrate 22') is made of an optically-isotropic material, typically polycarbonate resin, polyethersulfone resin, or glass. Substrate 22 is a lower substrate. Light-transmissive first conductive layer 23 (herein after referred to as 'layer 23'), made typically of indium tin oxide or tin oxide, is formed at a lower face of wave plate 21. Layer 23 is an upper conductive layer formed at a face, which is a side of substrate 22, of substrate body 30, also. Light-transmissive second conductive layer 24 (herein after referred to as 'layer 24'), made typically of indium tin oxide or tin oxide, is also formed on a top face of substrate 22. Layer 24 is a lower conductive layer, and the top face of substrate 22 is a face facing to layer 23. Layer 23 and layer 24 are formed typically using sputtering.

A plurality of dot spacers (not illustrated) are formed, using insulating resin typically epoxy resin or silicone resin, at predetermined intervals on a top face of layer 24. The top face of layer 24 is a face facing to the layer 23. A pair of upper electrodes (not illustrated), made typically of silver or carbon, are formed on both ends of layer 23. A pair of lower electrodes (not illustrated), made typically of silver or carbon, are formed on both ends of layer 24 in a direction perpendicular to the upper electrodes.

Wiring board 19 is film-shaped and is made typically of polyethylene terephthalate or polycarbonate resin. Wiring patterns (not illustrated) made typically of silver, carbon, or copper foil are formed on top and lower faces of wiring board 19. One end of each wiring pattern is coupled to the upper electrodes, lower electrodes, etc.

Frame-like spacer 25 is made of a material that is typically unwoven fabric or polyester film. Adhesive layers (not illustrated), typically of acrylic resin or rubber, which are applied to top and lower faces of spacer 25, attaches wave plate 21 and substrate 22 together by their outer borders. Accordingly, layer 23 and layer 24 are disposed facing each other with a predetermined space in between. The term 'frame-like shape' refers to a polygon such as quadrangle in which only the outer borders are formed like a frame.

Flexible polarizing plate 26 is formed typically by laminating a triacetyl cellulose film on top and lower faces of a stretched and oriented polarizer to which iodine and dye have been adsorbed in polyvinyl alcohol.

Still more, first elastic layer 28 (hereinafter simply referred to as 'layer 28') is formed between wave plate 21 and substrate 27. This layer 28 is an elastic adhesive layer made typically of acrylic rubber, silicone rubber, or fluoro-rubber. Furthermore, second elastic layer 29 (hereinafter referred to as 'layer 29') is formed between substrate 27 and polarizing plate 26, which is between substrate body 30 and polarizing plate 26. This layer 29 is an elastic adhesive layer made typically of acrylic rubber, silicone rubber, or fluoro-rubber, also. In other words, layer 28 attaches substrate 27 to a top face of wave plate 21 to configure substrate body 30 in which wave plate 21, layer 28 and substrate 27 are laminated. The top face of the wave plate 21 is a face which is an opposite side of substrate 22. In addition, layer 29 attaches polarizing plate 26 to a top face of substrate body 30. The top face of the substrate body 30 is a face which is an opposite side of layer 23. Touch panel 20 is configured as above.

Layers 28 and 29 have lower coefficient of elasticity and are softer than wave plate 21 and substrate 27. For example, the coefficient of elasticity of each of layers 28 and 29 is preferably $10^3$-$10^7$ Pa. The coefficient of elasticity of each of wave plate 21 and substrate 27 is preferably 2-3×$10^9$ Pa. Still more, layers 28 and 29 are thinner than wave plate 21 and substrate 27. For example, the thickness of each of layers 28 and 29 is preferably 5-50 μm, and the thickness of each of wave plate 21 and substrate 27 is preferably 100-200 μm.

Touch panel 20 is disposed on a front face typically of a liquid crystal display device (not illustrated), and mounted on an electronic device (not illustrated). A pair of upper electrodes and a pair of lower electrodes are then coupled to electronic circuit (not illustrated) of the electronic device via wiring board 19.

In the above structure, a top face of polarizing plate 26 at central part 26a, end 26b, and so on is pressed typically by a finger or pen while the user views what is displayed on the liquid crystal display device disposed on a rear face of touch panel 20. For example, touch panel 20 is operated in a direction indicated by arrow C or arrow D. This operation makes wave plate 21 dent, together with polarizing plate 26 and substrate 27, and layer 23 and layer 24 come into local contact at a portion pressed.

The electronic circuit then applies voltage sequentially to the upper electrodes and the lower electrodes. The electronic circuit detects a portion pressed based on the voltage ratio of the upper electrodes and the voltage ratio of the lower electrodes. This switches between the various functions of the electronic device.

When central part 26a is pressed, polarizing plate 26, substrate 27, and wave plate 21 dent almost evenly altogether. However, when end 26b, around inner rim 25b of spacer 25 in particular, is strongly pressed in a way such that to trace, an extreme bending force is applied to polarizing plate 26, substrate 27, and wave plate 21 at a portion pressed.

For example, if layers 28 and 29 are not provided, the extreme bending force generates a different level of dent on polarizing plate 26, substrate 27, and wave plate 21 respectively. In addition, a shearing force is generated on each contact faces of polarizing plate 26, substrate 27, and wave plate 21.

However, in touch panel 20, layers 28 and 29 are formed respectively on top and lower faces of substrate 27. Accordingly, elastic deformation takes place among polarizing plate 26, wave plate 21, and substrate 27 via layers 28 and 29. Furthermore, layers 28 and 29 reduce an impact applied at pressing touch panel 20. This suppresses damages to polarizing plate 26, wave plate 21, substrate 27, and layer 23.

In other words, layer 28 formed between wave plate 21 and substrate 27, and layer 29 formed between substrate 27 and polarizing plate 26 prevent any cracks or damages that may occur to layer 23 at the lower face of wave plate 21 even when end 26b is pressed. Consequently, an electrical contact between layer 23 and layer 24 is stably ensured.

External light, such as sunlight or lamplight irradiated from above touch panel 20, passes through wave plate 26 and substrate 27, and then enters wave plate 21. Since polarizing plate 26 has the characteristic of absorbing light in the Y direction, only the light linearly polarized in the X direction passes through polarizing plate 26, out of the incident light including light in the X direction and light in the Y direction which is perpendicular to the X direction. The linearly polarized light in the X direction passed through polarizing plate 26 passes substrate 27, and enters wave plate 21. However, light to be absorbed by polarizing plate 26 are not limited to those in the Y direction. For example, light absorbed by polarizing plate 26 may be those in the X direction.

Next, the light entering wave plate 21 is then polarized from linearly polarized light to circularly polarized light as a result of passing through wave plate 21. This circularly polarized light passes through layer 23, and is reflected upward on the surface of layer 24.

The light reflected on the surface of layer 24 passes through wave plate 21 again. The light is now linearly polarized in the Y direction which is shifted by a half-wavelength on entering polarizing plate 26. Since polarizing plate 26 only allows light in the X direction to pass through, polarizing plate 26 blocks any reflected light which is linearly polarized in the Y direction.

In other words, any external light entering touch panel 20 from above touch panel 20 is reflected upward on layer 24. However, polarizing plate 26 blocks the reflected light, and thus this light does not exit from the top face of polarizing plate 26 which is the operation face. Accordingly, reflection of external light on the operation face is suppressed, allowing easily viewable characters or images to be seen typically on the liquid crystal display device on the rear face of touch panel 20. Touch panel 20 with good viewability is thus achieved.

As described above, substrate 27 is laminated at the top face of wave plate 21 to configure substrate body 30. Polarizing plate 26 is laminated at the top face of substrate body 30. Still more, layer 28 is formed between wave plate 21 and substrate 27 to construct substrate body 30. Layer 29 is formed between substrate body 30 and polarizing plate 26. This structure allows elastic deformation of wave plate 21 and polarizing plate 26 via soft layers 28 and 29 at the top and lower faces of substrate 27 even when end 26b is pressed.

Furthermore, layers 28 and 29 reduce an impact applied at pressing touch panel 20. This prevents any cracks or damages that may occur to layer 23 at the lower face of substrate body 30 when touch panel 20 is pressed. As a result, touch panel 20 with reliable operation and good viewability is achieved.

In the above description, substrate body 30 has wave plate 21 at the side of substrate 22, substrate 27 at the side of layer 29, and layer 23 at a surface of wave plate 21. However, the present invention is not limited to this structure. For example, as shown in FIG. 3, substrate body 30 may have substrate 27 at the side of substrate 22, wave plate 21 at the side of layer 29, and layer 23 at a surface of substrate 27 in touch panel 20a. Still more, in touch panel 20a, polarizing plate 26 is formed at the top face of layer 29 and layer 29 is formed at a top face of wave plate 21. The top face of layer 29 is a face which is an opposite side of substrate 22 and the top face of wave plate 21 is a face which is an opposite side of the layer 23. Same as touch panel 20, any cracks or damages to layer 23 is prevented even when end 26b of touch panel 20a is pressed. The present invention thus offers touch panel 20a which ensures stable electrical contact between layer 23 and layer 24. Accordingly, touch panel 20a with reliable operation and good viewability is achieved.

In the above description, the coefficient of elasticity of layers 28 and 29 is preferably $10^3$-$10^7$ Pa, and the thickness of layers 28 and 29 is preferably 5-50 μm. However, the coefficient of elasticity of layers 28 and 29 is further preferably $10^4$-$10^6$ Pa, and the thickness of layers 28 and 29 is further preferably 15-30 μm. This further ensures the above effects, and facilitates fabrication of components using for touch panels 20 and 20a, and fabrication of touch panels 20 and 20a.

What is claimed is:

1. A touch panel comprising:
   a substrate body having a wave plate, a first elastic layer and a first substrate;
   a second substrate facing the substrate body;
   a first conductive layer formed at a face, which is a side of the second substrate, of the substrate body;
   a second conductive layer formed at a face of the second substrate and facing the first conductive layer with a predetermined space therebetween;
   a second elastic layer formed at a face, which is an opposite side of the first conductive layer, of the substrate body;
   a polarizing plate formed at a face, which is an opposite side of the second substrate, of the second elastic layer, wherein the first and second elastic layers are softer than both the wave plate and the first substrate.

2. The touch panel of claim 1,
   wherein the first substrate is formed at the substrate body and faces a side of the second substrate, and
   the first conductive layer is formed at a face of the first substrate.

3. The touch panel of claim 1,
   wherein the wave plate is formed at the substrate body and faces a side of the second substrate, and
   the first conductive layer is formed at a face of the wave plate.

4. The touch panel of claim 1,
   wherein the first and second elastic layers have a coefficient of elasticity in a range of $10^3$ to $10^7$ Pa and the wave plate and the first substrate have a coefficient of elasticity in a range of $2 \times 10^9$ to $3 \times 10^9$ Pa.

5. The touch panel of claim 1,
   wherein the first and second elastic layers are one of: (1) acrylic rubber; (2) silicone rubber; or (3) fluoro-rubber.

6. The touch panel of claim 1,
   wherein the first and second elastic layers have a thickness in a range of 15 μm to 30 μm.

7. The touch panel of claim 1,
   wherein the wave plate and the first substrate have a thickness in a range of 100 μm to 200 μm.

8. The touch panel of claim 1, further comprising
   a frame-like spacer provided at a periphery of the substrate body and between the substrate body and the second substrate,
   wherein the first and second elastic layers extend over the spacer.

* * * * *